United States Patent [19]

Turnage

[11] 4,239,133

[45] Dec. 16, 1980

[54] METERED DISPENSERS

[76] Inventor: Joseph R. Turnage, P.O. Box 1091, Morehead City, N.C. 28557

[21] Appl. No.: 908,368

[22] Filed: May 22, 1978

[51] Int. Cl.³ .............................................. B65D 47/06
[52] U.S. Cl. .................................... 222/476; 222/484
[58] Field of Search ............... 222/482, 483, 484, 476

[56] References Cited

U.S. PATENT DOCUMENTS

| | | | |
|---|---|---|---|
| 1,072,606 | 9/1913 | Griswold | 222/476 |
| 1,459,642 | 6/1923 | Turner | 222/484 X |
| 1,579,390 | 4/1926 | Peaden | 222/482 X |
| 2,490,721 | 12/1949 | Via | 222/476 |

*Primary Examiner*—Joseph J. Rolla
*Attorney, Agent, or Firm*—Finegan, Henderson, Farabow & Garrett

[57] ABSTRACT

A metered dispenser consisting of a spouted upper valve member connected by rod to a lower valve member of a product portion chamber. When the upper valve is closed the lower valve is opened to fill chamber and when the spout is opened the lower valve opening is closed so the spout empties contents of portion chamber only.

1 Claim, 4 Drawing Figures

METERED DISPENSERS

DESCRIPTION OF THE INVENTION

This invention relates to metered dispensers and more particularly to one dispensing an amount of container contents ascertained by the size of the portion chamber.

It is an object of this invention to effect the filling and emptying of the portion chamber by means of valves connected by the most direct and simple of constructions.

It is another object of this invention to allow an affordable, easily molded metered dispenser fulfilling the material and costs requirements for disposable containers.

These and other objects of the invention will become apparent with the accompanying descriptions of the accompanying drawings.

Referring to the drawings.

Figure 1:
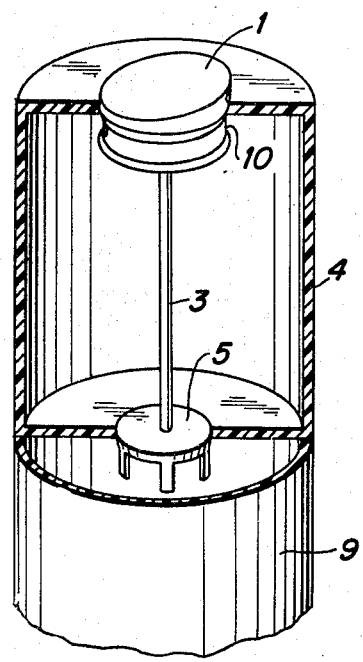
FIG. 1 is a perspective view of the device with the portion chamber 4 cutaway.
Figure 2:
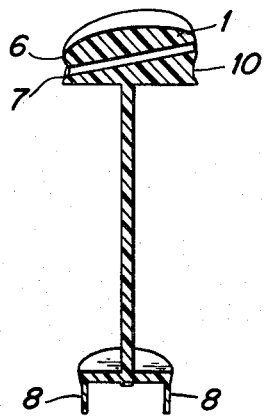
FIG. 2 is a view cutaway an line 2—2 of FIG. 1.

Referring to FIG. 1 of the drawings, the spout 1 and valve seats 6 and 7 are connected by rod 3 to lower valve 5. Said assemblage is contained within openings in portion chamber 4.

Figure 3:
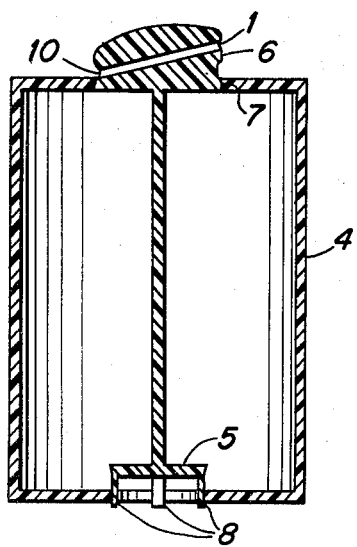
FIG. 3 is a cutaway side view of the device in an open/close mode.

When the spout 1 is pulled up the rod 3 lifts the lower valve 5, permitting the container 9 contents to fill the portion chamber 4 when tilted. Referring to FIG. 3 when the spout 1 is pulled up the lower valve seat 7 closes the spout 1 opening on the peripheral face 10 between the valve seats 6 and 7, therefore the portion chamber 4 is filled without pouring out any contents therein. The posts 8 act to center the lower valve 5 over the valve opening in the lower end of the portion chamber 4 when it is raised in the open position.

Figure 4:
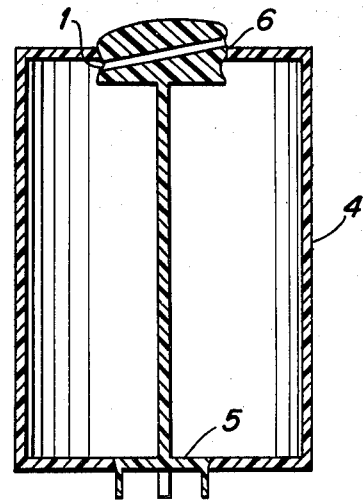
FIG. 4 is a side view of the same device in the other open/close position.

Referring to FIG. 4, when the spout 1 is pushed down the upper valve seat 6 seals against leakage and the portion chamber 4 contents are directed out of the spout 1. When the spout 1 is pushed down the lower valve 5 prevents any further flow into the portion chamber 4. The amount of the portion chamber 4 is the amount of the measure poured.

While I have described the embodiment of my invention it is to be understood that I do not limit myself to the precise constructions herein described and that various changes may be made within the scope of the invention by one skilled in the art.

What I claim is:

1. A dispenser for metering a fluid product comprising a product portion chamber, an upper valve member including a valve seat at the upper and lower edges thereof disposed in an opening at one end of the portion chamber, said upper valve member having a discharge passageway extending therethrough between the upper and lower valve edge seats and terminating above the upper valve edge seat, a lower valve member disposed in a second opening at the opposite end of the portion chamber, a plurality of posts extending from the lower valve member for centering the same in the second opening, a valve rod connecting the upper and lower valve members such that when said upper valve member discharge passageway is sealed the second opening and lower valve member are in an open position to facilitate filling the portion chamber and when the second opening is closed by the lower valve member the upper valve member discharge passageway is open permitting the portion chamber product to be dispensed.

* * * * *